United States Patent
Park et al.

(10) Patent No.: US 9,799,866 B2
(45) Date of Patent: Oct. 24, 2017

(54) ELECTROCHEMICAL DEVICE AND ITS MANUFACTURING METHOD

(75) Inventors: Pil-Kyu Park, Daejeon (KR); Sang-Young Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/447,050

(22) PCT Filed: Jul. 24, 2008

(86) PCT No.: PCT/KR2008/004330
§ 371 (c)(1),
(2), (4) Date: Apr. 24, 2009

(87) PCT Pub. No.: WO2009/014388
PCT Pub. Date: Jan. 29, 2009

(65) Prior Publication Data
US 2010/0003590 A1 Jan. 7, 2010

(30) Foreign Application Priority Data

Jul. 25, 2007 (KR) .................. 10-2007-0074403

(51) Int. Cl.
*H01M 2/16* (2006.01)
*H01M 4/62* (2006.01)
(Continued)

(52) U.S. Cl.
CPC ......... *H01M 2/1673* (2013.01); *H01M 2/166* (2013.01); *H01M 2/168* (2013.01);
(Continued)

(58) Field of Classification Search
CPC .... H01M 2/1673; H01M 4/622; H01M 2/166; H01M 2/1666; H01M 2/168; H01M 2/1686; H01M 4/621–4/623
(Continued)

(56) References Cited

U.S. PATENT DOCUMENTS

| 5,698,339 A | 12/1997 | Kawakami et al. |
| 5,958,622 A * | 9/1999 | Kojima ............... H01M 4/364 |
| | | 423/445 R |

(Continued)

FOREIGN PATENT DOCUMENTS

| CN | 1388606 A | 1/2003 |
| CN | 1969407 A | 5/2007 |

(Continued)

OTHER PUBLICATIONS

International Search Report, PCT/KR2008/004330.
International PCT Application No. PCT/KR2008/004330 filed Jul. 24, 2008, pp. 1,2, 35-6, 35-17.

*Primary Examiner* — Jonathan G Leong
(74) *Attorney, Agent, or Firm* — Lerner, David, Littenberg, Krumholz & Mentlik, LLP

(57) ABSTRACT

An electrochemical device includes an electrode structure provided with a composite separator having a porous substrate with a plurality of pores and a porous coating layer formed on at least one surface of the porous substrate and made of a mixture of electrode active material particles and a binder polymer. The porous coating layer of the composite separator improves thermal stability of the porous substrate and plays a function of electrode active material layer of the electrochemical device. Accordingly, this electrochemical device has excellent stability and good economical efficiency since the electrode structure does not need coating of an electrode active material layer on a surface of a current collector.

5 Claims, 1 Drawing Sheet

(51) Int. Cl.
*H01M 4/131* (2010.01)
*H01M 4/133* (2010.01)
*H01M 4/134* (2010.01)

(52) U.S. Cl.
CPC ....... *H01M 2/1653* (2013.01); *H01M 2/1666* (2013.01); *H01M 2/1686* (2013.01); *H01M 4/621* (2013.01); *H01M 4/622* (2013.01); *H01M 4/623* (2013.01); *H01M 4/131* (2013.01); *H01M 4/133* (2013.01); *H01M 4/134* (2013.01); *Y10T 29/49112* (2015.01)

(58) Field of Classification Search
USPC ................. 429/122–347; 29/623.1–623.5
See application file for complete search history.

(56) References Cited

U.S. PATENT DOCUMENTS

| | | | |
|---|---|---|---|
| 6,001,507 A * | 12/1999 | Ono et al. | 429/217 |
| 6,165,642 A * | 12/2000 | Kawakami et al. | 429/218.1 |
| 6,432,585 B1 | 8/2002 | Kawakami et al. | |
| 6,488,721 B1 * | 12/2002 | Carlson | 29/623.5 |
| 6,489,053 B1 | 12/2002 | Horie et al. | |
| 2001/0019798 A1 | 9/2001 | Kajiura et al. | |
| 2002/0028380 A1 * | 3/2002 | Tanjo | H01M 4/131 429/209 |
| 2002/0177037 A1 | 11/2002 | Birke-Salam et al. | |
| 2003/0079337 A1 * | 5/2003 | Woodnorth et al. | 29/623.1 |
| 2003/0170536 A1 | 9/2003 | Aihara et al. | |
| 2005/0118508 A1 * | 6/2005 | Yong et al. | 429/246 |
| 2005/0266150 A1 | 12/2005 | Yong et al. | |
| 2006/0008700 A1 | 1/2006 | Yong et al. | |
| 2006/0046149 A1 | 3/2006 | Yong et al. | |
| 2008/0292968 A1 * | 11/2008 | Lee et al. | 429/247 |
| 2009/0111026 A1 | 4/2009 | Kim et al. | |

FOREIGN PATENT DOCUMENTS

| | | |
|---|---|---|
| JP | H08140077 | 5/1994 |
| JP | H06-231766 A | 8/1994 |
| JP | H06-267590 A | 9/1994 |
| JP | H08-171901 A | 7/1996 |
| JP | 11-080395 | 3/1999 |
| JP | H11-242954 A | 9/1999 |
| JP | 2001052753 A | 2/2001 |
| JP | 2002-203603 A | 7/2002 |
| JP | 2002-260636 A | 9/2002 |
| JP | 2005-332809 | 12/2005 |
| KR | 1020020071204 | 9/2002 |
| KR | 1020060021221 | 3/2006 |
| KR | 1020060041649 | 5/2006 |
| KR | 1020060072065 | 6/2006 |
| KR | 1020060003665 | 11/2006 |
| KR | 1020070000231 A | 1/2007 |
| KR | 20070055979 A | 5/2007 |
| KR | 10-0727248 B1 | 6/2007 |
| WO | 99/19920 A1 | 4/1999 |
| WO | 2006004366 A1 | 1/2006 |
| WO | 2006/068428 A1 | 6/2006 |
| WO | 2007/061269 A1 | 5/2007 |
| WO | 2007/066967 A1 | 6/2007 |
| WO | WO 2007066966 A1 * | 6/2007 |

* cited by examiner

[Fig. 1]
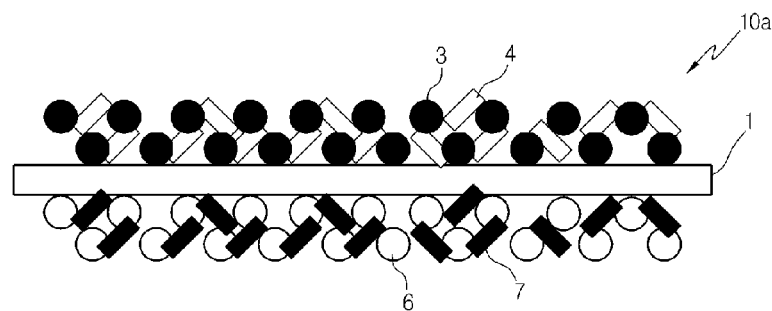
[Fig. 2]
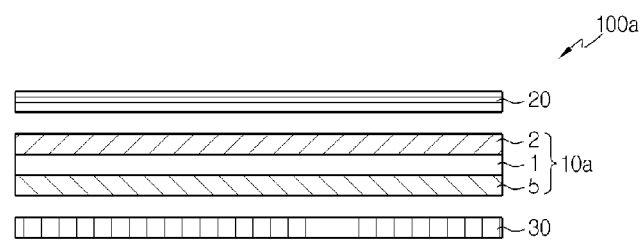
[Fig. 3]
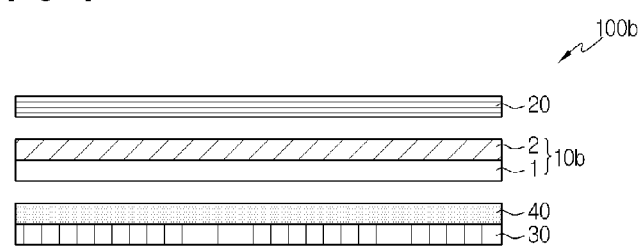
[Fig. 4]
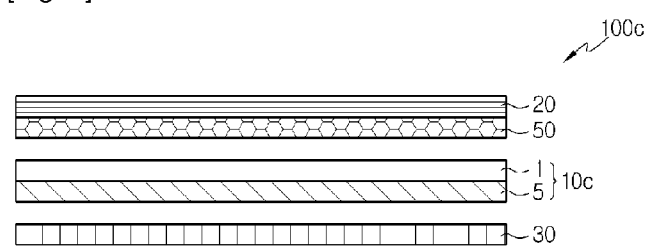
[Fig. 5]
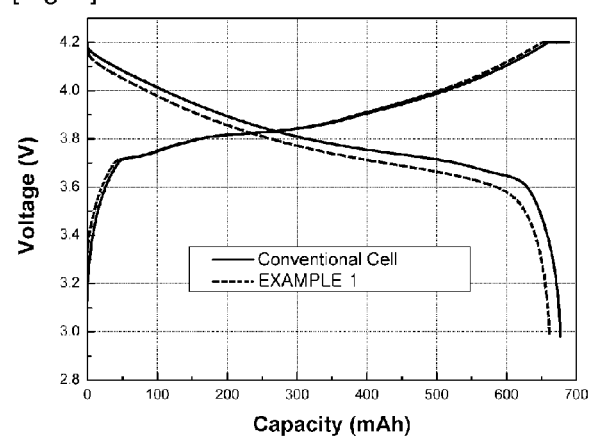

ELECTROCHEMICAL DEVICE AND ITS MANUFACTURING METHOD

CROSS REFERENCE TO RELATED APPLICATIONS

The present application is a national phase entry under 35 U.S.C. §371 of International Application No. PCT/KR2008/004330, filed Jul. 24, 2008, published in English, which claims the benefit of Korean Patent Application No. 10-2007-0074403, filed Jul. 25, 2007. The disclosures of said applications are incorporated by reference herein.

TECHNICAL FIELD

The present invention relates to an electrochemical device and its manufacturing method, and more particularly to an electrochemical device to which an electrode structure having a composite separator in which a porous coating layer is formed with a mixture of filler particles and binder polymer onto a surface of a porous substrate is applied.

BACKGROUND ART

Recently, there has been an increasing interest in energy storage technology. Batteries have been widely used as energy sources in the fields of cellular phones, camcorders, notebook computers, PCs and electric cars, resulting in intensive research and development into them. In this regard, electrochemical devices are one of the subjects of great interest. Particularly, development of rechargeable secondary batteries has been the focus of attention. Recently, the research and development into a novel electrode and a novel battery that can improve capacity density and specific energy have been made intensively in the field of the secondary batteries.

Among currently used secondary batteries, lithium secondary batteries developed in early 1990's have a higher drive voltage and a much higher energy density than those of conventional batteries using a liquid electrolyte solution such as Ni-MH batteries, Ni—Cd batteries, and $H_2SO_4$—Pb batteries. For these reasons, the lithium secondary batteries have been advantageously used. However, such a lithium secondary battery has disadvantages in that organic electrolytes used therein may cause safety-related problems such as ignition and explosion of the batteries and that processes for manufacturing such a battery are complicated. Recently, lithium-ion polymer batteries have been considered as one of the next-generation batteries since the above disadvantages of the lithium ion batteries are solved. However, the lithium-ion polymer batteries have a relatively lower battery capacity than those of the lithium ion batteries and an insufficient discharging capacity in low temperature, and therefore these disadvantages of the lithium-ion polymer batteries remain to be urgently solved.

Such electrochemical devices have been produced from many companies, and the battery stability has different phases in the electrochemical devices. Accordingly, it is important to evaluate and ensure the stability of the electrochemical batteries. First of all, it should be considered that errors in operation of the electrochemical device should not cause damage to users. For this purpose, the Safety Regulation strictly regulates ignition and explosion in the electrochemical devices. In the stability characteristics of the electrochemical device, overheating of the electrochemical device may cause thermal runaway, and explosion may occur when a separator is pierced. In particular, a polyolefin porous substrate commonly used as a separator of an electrochemical device shows extreme thermal shrinking behavior at a temperature of 100 C or above due to the features of its material and its manufacturing process such as elongation, so there may occur an electric short circuit between cathode and anode.

In order to solve the above safety-related problems of the electrochemical device, Korean Laid-open Patent Publication No. 10-2006-41649, 10-2006-72065 and 10-2007-231 disclose a composite separator having a porous coating layer formed by coating at least one surface of a porous substrate having many pores with a mixture of filler particles such as inorganic particles and a binder polymer. In the composite separator, the inorganic particles in the porous coating layer formed on the porous substrate act as a kind of spacer that keeps a physical shape of the porous coating layer, so the inorganic particles restrain thermal shrinkage of the porous substrate when the electrochemical device is overheated. In addition, interstitial volumes exist among the inorganic particles, thereby forming fine pores.

As mentioned above, the porous coating layer formed on the porous substrate attributes to improvement of stability of the electrochemical device. Conventional filler particles for forming a porous coating layer used $BaTiO_3$, $Pb(Zr,Ti)O_3$ (PZT), $ZrO_2$, $SiO_2$, $Al_2O_3$, $TiO_2$, lithium phosphate ($Li_3PO_4$), lithium titanium phosphate ($Li_xTi_y(PO_4)_3$, $0<x<2$, $0<y<3$), and so on, but these filler particles do not substitute the function of electrode active material in the aspect of electric features. Thus, the composite separator having a porous coating layer is interposed between a cathode current collector coated with cathode active material and an anode current collector coated with anode active material, thereby being assembled into an electrode stricture. This electrode stricture should experience a porous coating layer coating process and an electrode active material coating process, so its economical efficiency is lowered due to the complicated manufacturing process.

DISCLOSURE OF INVENTION

Technical Problem

An object of the present invention is to provide an electrochemical device having excellent thermal stability and good economical efficiency by adopting a porous coating layer to a porous substrate.

Another object of the present invention is to provide a method for manufacturing an electrochemical device with excellent thermal stability in a simple and economical way.

Technical Solution

In order to accomplish the above object, the present invention provides an electrochemical device, comprising (a) a composite separator having a porous substrate with a plurality of pores, a first porous coating layer formed on an upper surface of the porous substrate and made of a mixture of cathode active material particles and a first binder polymer, and a second porous coating layer formed on a lower surface of the porous substrate and made of a mixture of anode active material particles and a second binder polymer; (b) a cathode current collector prepared to face the first porous coating layer; and (c) an anode current collector prepared to face the second porous coating layer.

In another aspect of the present invention, there is also provided an electrochemical device, comprising (a) a composite separator having a porous substrate with a plurality of pores, and a first porous coating layer formed on an upper surface of the porous substrate and made of a mixture of cathode active material particles and a first binder polymer; (b) a cathode current collector prepared to face the first porous coating layer; and (c) an electrode stricture prepared to face a lower surface of the porous substrate and composed of an anode in which an anode active material layer is formed on an upper surface of an anode current collector.

In still another aspect of the present invention, there is also provided an electrochemical device, comprising (a) a composite separator having a porous substrate with a plurality of pores, and a second porous coating layer formed on a lower surface of the porous substrate and made of a mixture of anode active material particles and a second binder polymer; (b) an anode current collector prepared to face the second porous coating layer; and (c) an electrode stricture prepared to face an upper surface of the porous substrate and composed of a cathode in which a cathode active material layer is formed on a lower surface of a cathode current collector.

In order to accomplish the above object, the present invention also provides a method for manufacturing an electrochemical device, comprising (S1) applying a first binder polymer solution having cathode active material particles dispersed therein to an upper surface of a porous substrate with a plurality of pores and then drying the first binder polymer solution to prepare a porous substrate having a first porous coating layer; (S2) applying a second binder polymer solution having anode active material particles dispersed therein to a lower surface of the porous substrate having the first porous coating layer and then drying the second binder polymer to make a composite separator having a second porous coating layer; and (S3) interposing the composite separator between a cathode current collector and an anode current collector such that the first and second porous coating layers of the composite separator face each other, thereby manufacturing an electrode stricture.

In another aspect of the present invention, there is also provided a method for manufacturing an electrochemical device, comprising (S1) applying a first binder polymer solution having cathode active material particles dispersed therein to an upper surface of a porous substrate with a plurality of pores and then drying the first binder polymer solution to prepare a composite separator having a first porous coating layer; (S2) preparing an anode in which an anode active material layer is formed on an upper surface of an anode current collector; and (S3) interposing the composite separator between a cathode current collector and the anode current collector such that the first porous coating layer of the composite separator faces a lower surface of the porous substrate, thereby manufacturing an electrode stricture.

In still another aspect of the present invention, there is also provided a method for manufacturing an electrochemical device, comprising (S1) applying a second binder polymer solution having anode active material particles dispersed therein to a lower surface of a porous substrate and then drying the second binder polymer to make a composite separator having a second porous coating layer; and (S2) preparing a cathode in which a cathode active material is formed on a lower surface of a cathode current collector; and (S3) interposing the composite separator between the cathode current collector and an anode current collector such that the second porous coating layer of the composite separator faces an upper surface of the porous substrate, thereby manufacturing an electrode structure.

BRIEF DESCRIPTION OF THE DRAWINGS

FIG. 1 is a schematic sectional view showing a composite separator provided at an electrode stricture of an electrochemical device according to one embodiment of the present invention.

FIGS. 2 to 4 are schematic exploded sectional views respectively showing examples of the electrode stricture of the electrochemical device according to the present invention.

FIG. 5 is a graph showing measurement results of capacity to a cell of the embodiment 1 and a conventional cell.

BEST MODE FOR CARRYING OUT THE INVENTION

Hereinafter, the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

FIG. 1 is a schematic sectional view showing a composite separator provided at an electrode stricture of an electrochemical device according to one embodiment of the present invention, and FIG. 2 is a schematic exploded sectional view the electrode structure having the composite separator of FIG. 1.

A composite separator 10a has a first porous coating layer 2 and a second porous coating layer 5 respectively formed on both surfaces of a porous substrate 1 with a plurality of pores. The first porous coating layer formed on the upper surface of the porous substrate 1 is formed with a mixture of cathode active material particles 3 and a first binder polymer 4. Also, the second porous coating layer formed on the lower surface of the porous substrate 1 is formed with a mixture of anode active material particles 6 and a second binder polymer 7.

The porous coating layers 2, 5 of the composite separator 10a improves thermal stability of the porous substrate 1 as well known in the art. In addition, the first porous coating layer 2 having the cathode active material particles 3 plays a role of a cathode active material layer of an electrochemical device. Also, the second porous coating layer 5 having the anode active material particles 6 plays a role of an anode active material layer of the electrochemical device.

Accordingly, the electrode structure having the composite separator 10a of FIG. 1 does not need coating of cathode active material layer and anode active material layer on a surface of a current collector. Namely, as shown in FIG. 2, the composite separator 10a having the first porous coating layer 2 and the second porous coating layer 5 respectively formed on both surfaces of the porous substrate 1 with a plurality of pores is interposed between a cathode current collector 20 and an anode current collector 30 without electrode active material coating, thereby being made into an electrode stricture 100a. The cathode current collector 20 is prepared to face the first porous coating layer 2 having the cathode active material particles, and the anode current collector 30 is prepared to face the second porous coating layer 5 having the anode active material particles.

In another aspect of the present invention, a composite separator in which only the first porous coating layer is formed on one surface of the porous substrate may be applied to the electrode stricture.

Referring to FIG. 3, a composite separator 10b includes the first porous coating layer 2 formed only on the upper surface of the porous substrate with a plurality of pores. The first porous coating layer 2 formed on the upper surface of the porous substrate 1 is formed with a mixture of cathode active material particles and a first binder polymer. The first porous coating layer 2 improves thermal stability of the porous substrate 1 as well known in the art. Also, the first porous coating layer 2 having the cathode active material particles plays a role of a cathode active material layer of an electrochemical device.

An electrode structure 100b having the above composite separator 10b does not need coating of a cathode active material layer on a surface of a cathode current collector. Namely, as shown in FIG. 3, the composite separator 10b having the first porous coating layer 2 formed on the upper surface of the porous substrate 1 with a plurality of pores is interposed between the cathode current collector 20 without cathode active material layer coating and an anode in which an anode active material layer 40 is formed on an upper surface of an anode current collector 30, thereby being made into an electrode stricture 100b. The cathode current collector 20 is prepared to face the first porous coating layer 2 having the cathode active material particles, and the anode is prepared such that the anode active material layer 40 faces the lower surface of the porous substrate 1.

In another aspect of the present invention, a composite separator 10c has the second porous coating layer 5 formed only on the lower surface of the porous substrate 1 with a plurality of pores. The second porous coating layer 5 formed on the lower surface of the porous substrate 1 is formed with a mixture of anode active material particles 6 and a second binder polymer 7. The porous coating layer 5 improves thermal stability of the porous substrate 1 as well known in the art. In addition, the second porous coating layer 5 having the anode active material particles plays a role of an anode active material layer of an electrochemical device.

The electrode stricture 100c having the above composite separator 10c does not need coating of an anode active material layer on a surface of an anode current collector. Namely, as shown in FIG. 4, the composite separator 10c having the second porous coating layer 5 formed on the lower surface of the porous substrate 1 with a plurality of pores is interposed between a cathode current collector 20 without anode active material layer coating and a cathode formed on a lower surface of a cathode current collector 20, thereby being made into an electrode stricture 100c. The anode current collector 30 is prepared to face the second porous coating layer 5 having the anode active material particles, and the cathode is prepared such that a cathode active material layer 50 faces the upper surface of the porous substrate 1.

In the above electrode structures 100a, 100b, the cathode active material particles contained in the first porous coating layer 2 may use, but not limitedly, any cathode active material particle commonly used in an electrochemical device. For example, the cathode active material particle may use $LiCoO_2$, $LiNiO_2$, $LiMn_2O_4$, $LiCoPO_4$, $LiFePO_4$, $LiNiMnCoO_3$ or $LiNi_{1-x-y-z}Co_xM1_yM2_zO_2$ (M1 and M2 are independently any one selected from the group consisting of Al, Ni, Co, Fe, Mn, V, Cr, Ti, W, Ta, Mg and Mo, and x, y and z are independently atomic fractions of oxide atoms, where 0x<0.5, 0y<0.5, 0z<0.5), which are common cathode active material particles used in a conventional electrochemical device. They may be used in single or in mixture.

In addition, the first binder polymer contained in the first porous coating layer 2 may employ any polymer commonly used in the art for forming a porous coating layer on a porous substrate. In particular, a polymer having a glass transition temperature $T_g$ of −200 to 200° C., since such a polymer may improve mechanical properties such as flexibility and elasticity of the porous coating layer finally formed. This first binder polymer sufficiently plays a role of binder for connecting and stably fixing cathode active material particles, so it attributes to preventing deterioration of mechanical properties of the composite separator having the first porous coating layer.

Also, the first binder polymer may not have ion transferring capability, but a polymer with ion transferring capability may further improve the performance of an electrochemical device. Thus, the first binder polymer preferably has as high dielectric constant as possible. In fact, the dissociation of salt in an electrolyte depends on a dielectric constant of an electrolyte solvent, so the dissociation of salt in an electrolyte may be improved as the dielectric constant of the first binder polymer is higher. An available range of the dielectric constant of the binder polymer is 1.0 to 100 (measurement frequency is 1 kHz), and particularly the dielectric constant is preferably 10 or above.

In addition to the above function, the first binder polymer may be gelled when being swelled in a liquid electrolyte, to exhibit a high degree of swelling. Accordingly, the polymer preferably has a solubility of 15 to 45 $MPa^{1/2}$, more preferably 15 to 25 $MPa^{1/2}$ and 30 to 45 $MPa^{1/2}$. Thus, hydrophile polymers with a lot of polar groups are preferred rather than hydrophobic polymers such as polyolefin-based polymers. In case the solubility is less than 15 $MPa^{1/2}$ or higher than 45 $MPa^{1/2}$, polymer is not easily swelled in a common liquid electrolyte for batteries.

Such a polymer may be, but not limitedly, polyvinylidene fluoride-co-hexafluoropropylene, polyvinylidene fluoride-co-chlorotrifluoroethylene (PVdF-CTFE), polyvinylidene fluoride-co-trichloroethylene, polymethyl-methacrylate, polyaerylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethyl-cellulose, cyanoethylsucrose, pullulan, carboxyl methyl cellulose, or the like.

In addition, in the above electrode strictures 100a, 100c, the anode active material particles contained in the second porous coating layer 5 may employ any anode active material particle commonly used in an electrochemical device. For example, the anode active material particle may use natural graphite, artificial graphite, carbonaceous material, LTO (Low Temperature Oxide), silicon (Si), tin (Sn), or the like, which are common anode active material particles used as an anode active material particle of an electrochemical device, and they may be used in single or in mixture.

The second binder polymer contained in the second porous coating layer 5 may use polymers commonly used for forming a porous coating layer on a porous substrate in the art, similarly to the above first binder polymer, and the second binder polymer may be identical to or different from the first binder polymer.

In addition, in the above electrode strictures 100a, 100b, 100c, common inorganic filler particles, namely inorganic particles not causing oxidation and/or reduction in an operating voltage range (for example, 0 to 5V based on $Li/Li^+$) may be further added to the first and second porous coating layers 2, 5 of the composite separator 10a, 10b, 10c within the range not excessively deteriorating the output of an electrochemical device, in addition to the cathode active material particles and the anode active material particles. Also, conductive material may also be further added as required such that the first and second porous coating layers 2, 5 may sufficiently play a function of electrode active material.

In the above electrode structure 100a, 100b, 100c, the first and second porous coating layers 2, 5 preferably have an electrode active material size of 0.001 to 10 µm, though not limited thereto, so as to form a coating layer with a uniform thickness and keep suitable porosity. If the size is less than 0.001 µm, dispersion of the electrode active material particles may be deteriorated. If the size exceeds 10 µm, the thickness of the porous coating layer is increased, which may deteriorate mechanical properties. Also, due to the great pore size, the possibility of internal short circuit is increased during a battery charging/discharging process.

A ratio of the electrode active material particles of the first or second porous coating layer 2, 5 formed on the porous substrate 1 to the binder polymer is preferably 50:50 to 99:1, more preferably 70:30 to 95:5. If the ratio of the electrode active material particles to the binder polymer is less than 50:50, the content of the binder polymer is so great to deteriorate thermal stability improvement of the composite separator 10a, 10b, 10c and performance of the electrochemical device. Also, due to the reduction of interstitial volume among the electrode active material particles, the pore size and porosity may be decreased, which may cause deterioration of the performance of a final battery. There is no special limit in thickness of the first and second porous coating layers composed of electrode active material particles and binder polymer, but it is preferably 0.01 to 200 µm, independently. Also, there is also no special limit in pore size and porosity, but the pore size is preferably 0.001 to 10 µm, and the porosity is preferably 10 to 90%. The pore size and porosity are mainly dependent on the size of the electrode active material particles. For example, in case electrode active material particles have a diameter of 1 µm or less, the formed pores also exhibit a size of about 1 µm or less. Such a pore structure is filled with electrolyte injected afterwards, and the filled electrolyte plays a role of ion transferring. If the pore size and porosity are respectively less than 0.001 µm and 10%, the pores may act as a resistance layer. If the pore size and porosity respectively exceed 10 µm and 90%, mechanical properties may be deteriorated.

In addition, in the above electrode stricture 100a, 100b, 100c, the porous substrate 1 of the composite separator 10a, 10b, 10c may adopt any porous substrate commonly available in an electrochemical device such as a polyolefin-based porous substrate. The polyolefin-based porous substrate may be a non-woven fabric or a membrane formed using a polyolefin polymer containing polyethylene such as HDPE (high density polyethylene), LLDPE (linear low density polyethylene, LDPE (low density polyethylene) and UHMWPE (ultra high molecular weight polyethylene), polypropylene, polybutylene or polypentene, in single or in combination. The porous substrate preferably has a thickness of 5 to 50 µm, more preferably 1 to 200 µm, though not limited thereto, and also the pore size and porosity of the porous substrate are preferably 0.01 to 50 µm and 10 to 95%, respectively, though not limited thereto.

The above composite separator 10a, 10b, 10c may be manufactured in the following way, though not limited thereto.

First, the binder polymer is dissolved in a solvent to make a binder polymer solution, and electrode active material particles are added thereto and then dispersed. The solvent preferably has a solubility parameter similar to that of the used binder polymer and a low boiling point. It will help uniform mixture and easy removal of the solvent afterwards. A non-limiting example of usable solvent includes acetone, tetrahydrofuran, methylene chloride, chloroform, dimethylformamide, N-methyl-2-pyrrolidone (NMP), cyclohexane, water and mixtures thereof. It is preferred that the electrode active particles are pulverized after being added to the binder polymer solution. At this time, the time required for pulverization is suitably 1 to 20 hours, and the particle size of the pulverized particles preferably ranges from 0.001 and 10 µm, as mentioned above. Conventional pulverization methods may be used, and a method using a ball mill is particularly preferred.

After that, the porous substrate in which electrode active material particles are dispersed is coated with the binder polymer solution in which electrode active material particles are dispersed, under the humidity condition of 10 to 80%, and then dried to make a first porous coating layer or a second porous coating layer. From it, the composite separator 10b, 10c having the first or second porous coating layer is completed.

A method for coating the porous substrate with the binder polymer solution in which the electrode active particles are dispersed may use a common coating method well known in the art. For example, die coating and roll coating may be used.

If required, a second porous coating layer may be formed according to the above method on the other surface of the porous substrate having the first or second porous coating layer on its one surface. From it, a composite separator 10a having the first and second porous coating layers is completed.

A method for manufacturing an electrode stricture of an electrochemical device using the composite separator 10a, 10b, 10c prepared as mentioned above is not explained.

First, the composite separator 10a having the first porous coating layer 2 and the second porous coating layer 5 respectively formed on both surfaces of the porous substrate 1 is interposed between the cathode current collector 20 and the anode current collector 30 such that the first and second porous coating layers 2 and 5 of the composite separator 10a face each other, thereby manufacturing the electrode stricture 100a of FIG. 2.

Second, the composite separator 10b having the first porous coating layer 2 formed on the upper surface of the porous substrate 1 is interposed between the cathode current collector 20 and an anode in which the anode active material layer 40 is formed on the upper surface of the anode current collector 30, thereby manufacturing the electrode stricture 100b of FIG. 3.

Third, the composite separator 10a having the second porous coating layer 5 formed on the lower surface of the porous substrate 1 is interposed between the anode current collector 30 and a cathode in which the cathode active material layer 50 is formed on the lower surface of the cathode current collector 20, thereby manufacturing the electrode stricture 100c of FIG. 4.

In the electrode structure 100a, 100b, 100c manufactured according to the above method, the composite separator and the electrode current collector or the electrode may be laminated if their physical contact is sufficient.

In the above electrode structure 100a, 100b, 100c, the cathode or anode current collector may use any current collector commonly available for cathode and anode of an electrochemical device. For example, the cathode current collector may use a foil formed of aluminum, nickel or the like, and the anode current collector may use a foil formed of copper, gold, nickel, copper alloys or the like, but not limitedly. In addition, the anode active material layer 40 or the cathode active material layer 50 respectively formed on the anode and the cathode may be formed in a common way available for an electrochemical device. The electrode active material particles used in the electrode may employ a common electrode active material particle available for cathode and anode, as specifically explained above.

The electrochemical device includes all kinds of devices experiencing electrochemical reaction. For example, the electrochemical device includes all kinds of primary batteries, secondary batteries, fuel cells, solar cells or capacitors such as a super capacitor. In particular, among the secondary batteries, lithium secondary batteries including a lithium metal secondary battery, a lithium ion secondary battery, a lithium polymer secondary battery or a lithium ion polymer secondary battery are preferred.

The electrochemical device may be manufactured according to common methods well known in the art. As an example, the electrochemical device may be manufactured by assembling the electrode structure 100a, 100b, 100c and then injecting electrolyte therein.

The electrolyte available in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an salt containing an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and combinations thereof. The salt may be dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (g-butyrolactone) and mixtures thereof. However, the electrolyte available in the present invention is not limited to the above examples.

The electrolyte may be injected in a suitable step during the manufacturing process of a battery, according to a manufacturing process or desired properties of a final product. In other words, the electrolyte may be injected before a battery is assembled or during a final step of the assembly process of a battery.

MODE FOR THE INVENTION

Hereinafter, various preferred examples of the present invention will be described in detail for better understandings. However, the examples of the present invention may be modified in various ways, and they should not be interpreted as limiting the scope of the invention. The examples of the present invention are just for better understandings of the invention to persons having ordinary skill in the art.

EXAMPLE 1

Manufacture of Composite Separator

PVdF-CTFE (polyvinylidene fluoride-co-chlorotrifluoroethylene) and cyanoethylpullulan were respectively added to acetone at a weight ratio of 10:2 and then dissolved at 50° C. for about 12 hours to make a polymer solution. Cathode active material powder ($LiCoO_2$) and conductive material were added to the prepared polymer solution such that a weight ratio of polymer mixture/cathode active material powder/conductive material is 6/90/4, and then activated carbon powder was pulverized and dispersed for over 12 hours by means of ball milling to make a slurry. The cathode active material particles of the prepared slurry may be controlled according to size (diameter) of beads used for ball milling or time for ball milling, but this example conducted pulverization into about 600 nm to make the slurry.

The prepared slurry was applied to one surface of a polyethylene porous separator (having a porosity of 45%) with a thickness of 12 μm by means of roll coating to form a first porous layer. The coating thickness was controlled to be about 100 μm. A pore size in the porous coating layer formed on the polyethylene porous separator was in the level of 0.4 μm, and a porosity was in the level of 66%.

On the other surface of the polyethylene porous substrate having the first porous coating layer on its one surface, a second porous coating layer was formed in the following way.

PVdF-CTFE (polyvinylidene fluoride-co-chlorotrifluoroethylene) and cyanoethylpullulan were respectively added to acetone at a weight ratio of 10:2 and then dissolved at 50° C. for about 12 hours to make a polymer solution. Graphite anode active material powder was added to the prepared polymer solution such that a weight ratio of polymer mixture/graphite powder/conductive material is 6/93/1, and then the graphite powder was pulverized into about 800 nm and dispersed for over 12 hours by means of ball milling to make a slurry. The prepared slurry was applied to the other surface of the polyethylene porous separator by means of roll coating and then dried to form a second porous coating layer. The coating thickness was controlled to be about 50 μm.

Manufacture of Battery

The composite separator prepared as above was interposed between an aluminum (Al) film of a cathode current collector with a thickness of 20 μm and a copper (Cu) film of an anode current collector with a thickness of 10 μm, and then taken up for assembling. Then, an electrolyte (ethylenecarbonate (EC)/ethylmethylcarbonate (EMC)=½ (a volume ratio), 1 mol of lithiumhexafluorophosphate ($LiPF_6$)) was injected into the assembled battery, thereby manufacturing a lithium secondary battery.

EXAMPLE 2

Manufacture of Composite Separator

PVdF-CTFE (polyvinylidene fluoride-co-chlorotrifluoroethylene) and cyanoethylpullulan were respectively added to acetone at a weight ratio of 10:2 and then dissolved at 50° C. for about 12 hours to make a polymer solution. Cathode active material powder ($LiCoO_2$) and conductive material were added to the prepared polymer solution such that a weight ratio of polymer mixture/cathode active material powder/conductive material is 6/90/4, and then activated carbon powder was pulverized and dispersed for over 12 hours by means of ball milling to make a slurry. The cathode active material particles of the prepared slurry had a diameter of about 600 nm.

The prepared slurry was applied to one surface of a polyethylene porous separator (having a porosity of 45%) with a thickness of 12 μm by means of roll coating to form a porous coating layer. The coating thickness was controlled to be about 100 μm. A pore size in the porous coating layer formed on the polyethylene porous separator was in the level of 0.4 μm, and a porosity was in the level of 66%.

Manufacture of Battery

The composite separator prepared as above was interposed between an aluminum (Al) film of a cathode current collector with a thickness of 20 μm and a copper (Cu) film coated with graphite such that the porous coating layer faces the cathode current collector, and then taken up for assembling. Then, an electrolyte (ethylenecarbonate (EC)/ethylmethylcarbonate (EMC)=½ (a volume ratio), 1 mol of lithiumhexafluorophosphate (LiPF$_6$)) was injected into the assembled battery, thereby manufacturing a lithium secondary battery.

EXAMPLE 3

Manufacture of Composite Separator

PVdF-CTFE (polyvinylidene fluoride-co-chlorotrifluoroethylene) and cyanoethylpullulan were respectively added to acetone at a weight ratio of 10:2 and then dissolved at 50° C. for about 12 hours to make a polymer solution. Graphite anode active material powder was added to the prepared polymer solution such that a weight ratio of polymer mixture/graphite powder/conductive material is 6/93/1, and then the graphite powder was pulverized into about 800 nm and dispersed for over 12 hours by means of ball milling to make a slurry. The prepared slurry was applied to the other surface of the polyethylene porous separator by means of roll coating and then dried to form a porous coating layer. The coating thickness was controlled to be about 50 μm.

Manufacture of Battery

The composite separator prepared as above was interposed between a copper (Cu) film with a thickness of 10 μm and a cathode active material LiCoO$_2$ such that the porous coating layer faces the anode current collector, and then taken up for assembling. Then, an electrolyte (ethylenecarbonate (EC)/ethylmethylcarbonate (EMC)=½ (a volume ratio), 1 mol of lithiumhexafluorophosphate (LiPF$_6$)) was injected into the assembled battery, thereby manufacturing a lithium secondary battery.

Evaluation of Thermal Shrinkage of Separator

The composite separators according to the examples 1 to 3 were kept at 150° C. for 1 hour, and then their thermal shrinkages were evaluated and then listed in the following table 1.

As a result of the experiment, the composite separators according to the present invention exhibited a thermal shrinkage less than 5%, while a separator (a control group) made of a common polyethylene porous film not without a porous coating layer exhibited a thermal shrinkage of 80% or above.

TABLE 1

| Condition | Examples 1 to 3 | Control Group |
|---|---|---|
| Thermal Shrinkage | <5% | >80% |

Evaluation of Insulation Resistance of Separator

An insulation resistance tester (a megohmmeter) was used to connect each point existing on both surfaces of the separator, and then a Hi-pot test was conducted for measurement. After a voltage of 250V was applied and a current of 0.5 mA was flowed, a resistance value was measured, and then pass/fail was determined based on 100 Mohm.

As a result of the measurement, the composite separators of the examples 1 to 3 all passed in the insulation resistance test.

Evaluation of Capacity of Battery

Capacity of batteries having the battery of the example 1 and a control group with a polyethylene separator was measured, and its results are shown in FIG. 5.

Referring to FIG. 5, it would be understood that the battery of the example 1 having the composite separator of the present invention exhibits capacity substantially equal to that of the conventional cell with a common polyolefin separator.

INDUSTRIAL APPLICABILITY

The porous coating layer formed on at least one surface of the composite separator provided to the electrode structure of the electrochemical device according to the present invention improves thermal stability of the porous substrate and plays a function of an electrode active material layer of the electrochemical device. Accordingly, the electrode stricture applied to the electrochemical device of the present invention may be manufactured more economically due to reduced process, since its electrode stricture does not need coating of a cathode active material layer and/or an anode active material layer on a surface of a current collector.

The invention claimed is:

1. A lithium secondary battery comprising:
   (a) a composite separator consisting of:
      (i) a polyolefin-based porous separator having a plurality of pores, a first surface and a second surface opposite the first surface; and
      (ii) a porous coating layer present on the first surface of the polyolefin-based porous separator, the porous coating layer comprising a mixture of cathode active material particles and a first binder polymer, wherein the first binder polymer comprises a uniform mixture of polyvinylidene fluoride-co chlorotrifluoroethylene (PVdF-CTFE) and cyanoethylpullulan, wherein the first binder polymer connects and stably fixes the cathode active material particles, and wherein the porous coating layer does not include inorganic filler particles;
   (b) a cathode current collector facing and contacting the porous coating layer of the polyolefin-based porous separator in (a); and
   (c) an anode electrode structure comprising:
   (i) an anode current collector layer having a first surface and a second surface opposite the first surface; and
   (ii) a surface layer present on the first surface of the anode current collector, and comprising an anode active material, and wherein the surface layer is facing and contacting the second surface of the polyolefin-based porous separator in (a),
   wherein the cathode active material particles are any one selected from the group consisting of LiCoO$_2$, LiNiO$_2$, LiCoPO$_4$, LiFePO$_4$, and LiNi$_{1-x-y-z}$Co$_x$M1$_y$M2$_z$O$_2$ (M1 and M2 are independently any one selected from the group consisting of Al, Ni, Co, Fe, V, Cr, Ti, W, Ta, Mg and Mo, and x, y and z are independently atomic fractions of oxide atoms, where 0<x<0.5, 0<y<0.5, 0<z<0.5), and mixtures thereof, wherein
a weight ratio of the PVdF-CTFE and the cyanoethylpullulan is 10:2,
a weight ratio of the cathode active material particle and the first binder polymer in the porous coating layer is 50:50 to 99:1,
the porous coating layer has a thickness of 0.01 to 200 μm
the polyolefin-based porous separator has a thickness of 0.01 to 200 μm,
the pores in the porous coating layer have a pore size of 0.001 to 10 μm; and
a degree of porosity in the porous coating layer is 10 to 90%.

2. The lithium secondary battery according to claim 1, wherein the anode active material particle is any one anode active material particle selected from the group consisting of natural graphite, artificial graphite, carbonaceous material, LTO (Low Temperature Oxide), silicon (Si) and tin (Sn), or their mixture.

3. The lithium secondary battery according to claim 1, wherein the cathode active material particle has a size of 0.001 to 10 μm.

4. The lithium secondary battery according to claim 1, wherein the anode active material particle has a size of 0.001 to 10 μm.

5. A lithium secondary battery comprising:
(a) a composite separator consisting of:
(i) a polyolefin-based porous separator having a plurality of pores, a first surface and a second surface opposite the first surface; and
(ii) a porous coating layer present on the first surface of the polyolefin-based porous separator, the porous coating layer comprising a mixture of cathode active material particles, a conductive material and a first binder polymer, wherein the first binder polymer comprises a uniform mixture of polyvinylidene fluoride-co-chlorotrifluoroethylene (PVdF-CTFE) and cyanoethylpullulan, wherein the first binder polymer connects and stably fixes the cathode active material particles, and wherein the porous coating layer does not include inorganic filler particles;
(b) a cathode current collector facing and contacting the porous coating layer of the polyolefin-based porous separator in (a); and
(c) an anode electrode structure comprising:
(i) an anode current collector layer having a first surface and a second surface opposite the first surface; and
(ii) a surface layer present on the first surface of the anode current collector, and comprising an anode active material, and wherein the surface layer is facing and contacting the second surface of the polyolefin-based porous separator in (a),
wherein the cathode active material particles are any one selected from the group consisting of $LiCoO_2$, $LiNiO_2$, $LiCoPO_4$, $LiFePO_4$, and $LiNi_{1-x-y-z}Co_xM1_yM2_zO_2$ (M1 and M2 are independently any one selected from the group consisting of Al, Ni, Co, Fe, V, Cr, Ti, W, Ta, Mg and Mo, and x, y and z are independently atomic fractions of oxide atoms, where $0<x<0.5$, $0<y<0.5$, $0<z<0.5$), and mixtures thereof, wherein
a weight ratio of the PVdF-CTFE and the cyanoethylpullulan is 10:2,
a weight ratio of the cathode active material particle and the first binder polymer in the porous coating layer is 50:50 to 99:1,
the porous coating layer has a thickness of 0.01 to 200 μm
the polyolefin-based porous separator has a thickness of 0.01 to 200 μm,
the pores in the porous coating layer have a pore size of 0.001 to 10 μm; and
a degree of porosity in the porous coating layer is 10 to 90%.

* * * * *